United States Patent
Nagy et al.

(10) Patent No.: US 10,337,874 B2
(45) Date of Patent: Jul. 2, 2019

(54) ROUTE SELECTION BASED ON AUTOMATIC-MANUAL DRIVING PREFERENCE RATIO

(71) Applicant: Robert Bosch GmbH, Stuttgart (DE)

(72) Inventors: Akos Nagy, Mountain View, CA (US); Jan Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 15/540,541

(22) PCT Filed: Dec. 30, 2015

(86) PCT No.: PCT/US2015/068014
§ 371 (c)(1),
(2) Date: Jun. 28, 2017

(87) PCT Pub. No.: WO2016/109637
PCT Pub. Date: Jul. 7, 2016

(65) Prior Publication Data
US 2017/0370740 A1     Dec. 28, 2017

Related U.S. Application Data

(60) Provisional application No. 62/097,875, filed on Dec. 30, 2014.

(51) Int. Cl.
*G01C 21/34*     (2006.01)
*G01C 21/36*     (2006.01)
(Continued)

(52) U.S. Cl.
CPC ..... *G01C 21/3484* (2013.01); *G01C 21/3605* (2013.01); *G01C 21/3664* (2013.01);
(Continued)

(58) Field of Classification Search
CPC .......... F16H 61/08; F16H 61/68; F16H 61/70; F16H 37/022; F16H 61/66259;
(Continued)

(56) References Cited

U.S. PATENT DOCUMENTS 8,467,961 B2    6/2013    Obradovich et al.
8,630,800 B1    1/2014    Connolly et al.
(Continued)

FOREIGN PATENT DOCUMENTS

EP          2789977 A1    10/2014
WO    2014139821 A1    9/2014

OTHER PUBLICATIONS

International Search Report and Written Opinion for Application No. PCT/US2015/068014 dated Mar. 23, 2016, (11 pages).

*Primary Examiner* — Behrang Badii
(74) *Attorney, Agent, or Firm* — Michael Best & Friedrich LLP

(57) ABSTRACT

A navigation system is described for a vehicle equipped with an autonomous driving system. The navigation system includes a human-machine interface with a display and a user control, and an electronic controller. The controller is configured to calculate a plurality of travel routes from a determined starting point to a defined destination point. The controller determines which portions of each travel route will utilized automated driving operation and which portions will utilized manual driving operation. Based on an input received from the user control, the controller defines an automatic-manual driving preference ratio indicating a driver preference for an amount of manual driving operation relative to an amount of automatic driving operation. The controller automatically selects a route from the plurality of (Continued)

travel routes that most closely matches the defined automatic-manual driving preference ratio and outputs the selected route on the display.

12 Claims, 3 Drawing Sheets

(51) Int. Cl.
| | |
|---|---|
| *F16H 61/08* | (2006.01) |
| *B60W 10/26* | (2006.01) |
| *B60R 16/02* | (2006.01) |
| *B60W 30/188* | (2012.01) |
| *F16H 37/02* | (2006.01) |
| *F16H 61/70* | (2006.01) |
| *F02D 17/02* | (2006.01) |
| *H02J 7/00* | (2006.01) |
| *B60L 1/00* | (2006.01) |
| *H02J 7/16* | (2006.01) |
| *B60H 1/00* | (2006.01) |
| *B60W 10/06* | (2006.01) |

(52) U.S. Cl.
CPC ..... *G01C 21/3676* (2013.01); *G01C 21/3697* (2013.01); *B60H 1/00742* (2013.01); *B60L 1/003* (2013.01); *B60R 16/02* (2013.01); *B60W 10/06* (2013.01); *B60W 10/26* (2013.01); *B60W 30/188* (2013.01); *F02D 17/02* (2013.01); *F16H 37/02* (2013.01); *F16H 61/08* (2013.01); *F16H 61/70* (2013.01); *H02J 7/00* (2013.01); *H02J 7/16* (2013.01)

(58) Field of Classification Search
CPC ............. F16H 61/0213; F16H 61/0246; F16H 61/0248; F16H 61/061; F16H 63/46; F02D 17/02; F02D 29/06; B60L 1/003; B60L 11/1862; B60L 11/14; B60L 7/12; B60W 10/02; B60W 10/06; B60W 30/1886; B60W 10/30; B60W 10/26; B60W 10/11; B60W 30/18045; G01C 21/3484; G01C 21/3605; G01C 21/3664; G01C 21/3676; G01C 21/3697; H02J 7/16; H02J 7/1438; H02J 7/00; F02N 11/0862; B60H 1/00742; B60H 1/322; B60H 1/004; B60R 16/02; B60R 16/0236

See application file for complete search history.

(56) References Cited

U.S. PATENT DOCUMENTS

| | | | |
|---|---|---|---|
| 8,676,507 | B2 | 3/2014 | Spindler et al. |
| 2003/0121343 | A1* | 7/2003 | Berger .................... F16H 61/28 74/340 |
| 2004/0015291 | A1 | 1/2004 | Petzold et al. |
| 2005/0000310 | A1* | 1/2005 | Yamamoto .............. F16H 63/42 74/473.18 |
| 2005/0223834 | A1* | 10/2005 | Otsuka ................ F16H 59/0204 74/473.18 |
| 2008/0208469 | A1 | 8/2008 | Obradovich et al. |
| 2010/0036599 | A1 | 2/2010 | Froeberg et al. |
| 2010/0100289 | A1* | 4/2010 | Tawara ............... F16H 61/0213 701/52 |
| 2012/0022904 | A1 | 1/2012 | Mason et al. |
| 2012/0143451 | A1* | 6/2012 | Nishida ............... F16H 61/0213 701/52 |
| 2012/0179361 | A1 | 7/2012 | Mineta et al. |
| 2013/0249814 | A1 | 9/2013 | Zeng |
| 2013/0297159 | A1* | 11/2013 | Nishida .................. F16H 61/68 701/52 |
| 2016/0046292 | A1* | 2/2016 | Miyashita ............... F02D 17/02 701/36 |
| 2016/0146343 | A1* | 5/2016 | Inoue ..................... F16H 61/08 701/52 |

* cited by examiner

ROUTE SELECTION BASED ON AUTOMATIC-MANUAL DRIVING PREFERENCE RATIO

RELATED APPLICATIONS

This application claims the benefit of U.S. Provisional Application No. 62/097,875, filed Dec. 30, 2014, the entire contents of which are incorporated herein by reference.

BACKGROUND

Embodiments of the invention relate to the field of automotive control systems. In particularly, some embodiments of the invention relate to driver assistance systems and driver interface devices.

Driver assistance systems such as, for example, adaptive cruise control and automated lane change systems have been successfully deployed to the market to increase of driver comfort and safety. As these driver assistance systems progress in sophistication, less driver interaction may be required. In some cases, the driver assistance systems may be fully automated for portions of a trip. Accordingly, the role of the driver has changed from that of an active driver to that of a passenger, for at least some portion of the trip. Highly automated vehicles allow the driver to hand over control to the automated vehicle and to do other tasks while driving.

SUMMARY

In some embodiments, automatic vehicle systems provide for automated control of the vehicle (e.g., automatic driving) without user intervention for an entire trip or for portions of a trip. For example, the automated vehicle system in some embodiments may be configured to operate autonomously during relatively straight and uniform terrain while, conversely, being configured to require human operation of the vehicle in more challenging terrain such as, for example, extraordinarily curvy roads. In some embodiments, the invention provides a navigation system with a user interface to enable a driver to select from among several planned routes. The route selection is based on criteria such as the fastest route, the highest percentage of highways, no toll roads, and a share of automated driving vs. manual driving.

In one embodiment, the invention provides a navigation system for a vehicle equipped with an autonomous driving system. The navigation system includes a human-machine interface with a display and a user control, and an electronic controller. The controller is configured to calculate a plurality of travel routes from a determined starting point to a defined destination point. The controller determines which portions of each travel route will utilized automated driving operation and which portions will utilized manual driving operation. Based on an input received from the user control, the controller defines an automatic-manual driving preference ratio indicating a driver preference for an amount of manual driving operation relative to an amount of automatic driving operation. The controller automatically selects a route from the plurality of travel routes that most closely matches the defined automatic-manual driving preference ratio and outputs the selected route on the display.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
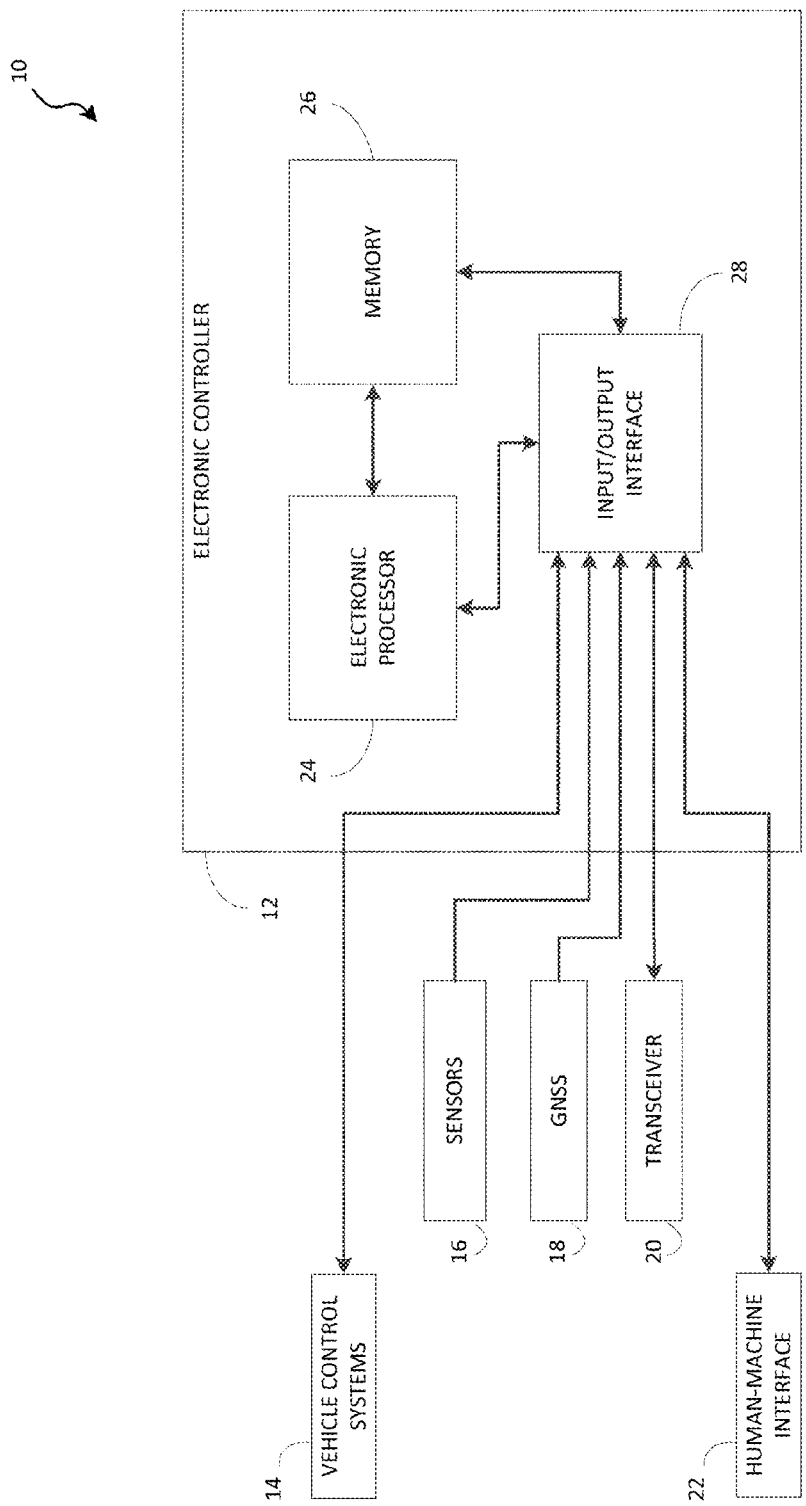
FIG. 1 is a block diagram of an autonomous vehicle control system in accordance with some embodiments.

FIG. 1 is a block diagram of one exemplary embodiment of an autonomous vehicle control system 10. As described more particularly below, the autonomous vehicle control system 10 may be mounted on, or integrated into, a vehicle (not shown) and autonomously drives the vehicle. It should be noted that, in the description that follows, the terms "autonomous vehicle" and "automated vehicle" should not be considered limiting. The terms are used in a general way to refer to an autonomous or automated driving vehicle, which possesses varying degrees of automation (i.e., the vehicle is configured to drive itself with limited, or in some cases no, input from a driver). The systems and methods described herein may be used with any vehicle capable of operating partially or fully autonomously, being controlled manually by a driver, or some combination of both.

In the example illustrated, the autonomous vehicle control system 10 includes an electronic controller 12, vehicle control systems 14, sensors 16, a global navigation satellite system (GNSS) 18, a transceiver 20, and a human-machine interface (HMI) 22. The components of the autonomous vehicle control system 10, along with other various modules and components are electrically coupled to each other by or through one or more control or data buses, which enable communication therebetween. The use of control and data buses for the interconnection between, and communication among, the various modules and components would be known to a person skilled in the art in view of the invention described herein. In alternative embodiments, some or all of the components of the autonomous vehicle control system 10 may be communicatively coupled using suitable wireless modalities (for example, Bluetooth™ or near field communication). For ease of description, the autonomous vehicle control system 10 illustrated in FIG. 1 includes one of each of the foregoing components. Alternative embodiments may include one or more of each component, or may exclude or combine some components. The electronic controller 12 controls the vehicle control systems 14, sensors 16, GNSS 18, transceiver 20, HMI 22, to autonomously control the vehicle according to the methods described herein. In some embodiments, the electronic controller 12 controls the vehicle control systems 14, sensors 16, GNSS 18, transceiver 20, HMI 22 by transmitting control signals or instructions to these devices and systems.

The electronic controller 12 includes an electronic processor 24 (e.g., a microprocessor, application specific integrated circuit, etc.), a memory 26, and an input/output interface 28. The memory 26 may be made up of one or more non-transitory computer-readable media, and includes at least a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 24 is coupled to the memory 26 and the input/output interface 28. The electronic processor 24 sends and receives information (e.g., from the memory 26 and/or the input/output interface 28), and processes the information by executing one or more software instructions or modules, capable of being stored in the memory 26, or another non-transitory computer readable medium. The software can include firmware, one or more applications, program data, filters, rules, one or more program modules, and other executable instructions. The electronic processor 24 is configured to retrieve from the memory 26 and execute, among other things, software for autonomous vehicle control, and for performing methods as described herein.

The input/output interface 28 transmits and receives information from devices external to the electronic controller 12 (e.g., over one or more wired and/or wireless connections), such as the vehicle control systems 14, the sensors 16, the GNSS 18, the transceiver 20, and the HMI 22. The input/output interface 28 receives user input, provides system output, or a combination of both. As described herein, user input from a driver or passenger of a vehicle may be provided via the HMI 22, for example, as a touch-screen display. The input/output interface 38 may also include other input and output mechanisms, which for brevity are not described herein and which may be implemented in hardware, software, or a combination of both.

It should be understood that although FIG. 1 illustrates only a single electronic processor 24, memory 26, and input/output interface 28, alternative embodiments of the electronic controller 12 may include multiple processing units, memory modules, and/or input/output interfaces. It should also be noted that the autonomous vehicle control system 10 may include other electronic controllers, each including similar components as, and configured similarly to, the electronic controller 12. In some embodiments, the electronic controller 12 is implemented partially or entirely on a semiconductor (e.g., a field-programmable gate array ["FPGA"] semiconductor) chip. Similarly, the various modules and controllers described herein may be implemented as individual controllers, as illustrated, or as components of a single controller. In some embodiments, a combination of approaches may be used.

The electronic processor 24 uses the input/output interface 28 to send and receive information or commands to and from the vehicle control systems 14 (e.g., over a vehicle communication bus, such as a CAN bus). The vehicle control systems 14 include components (e.g., actuators, motors, and controllers) to control a plurality of vehicle systems (e.g., braking, steering, and engine power output). For the sake of brevity, the vehicle control systems 14 will not be described in greater detail. The electronic processor 24 is configured to operate the vehicle control systems 14 to autonomously drive the vehicle. In some embodiments, the vehicle control systems 14 are controlled to automatically drive the vehicle without driver intervention or input for the entirety of a trip. In other embodiments, the vehicle control systems 14 are controlled to drive the vehicle for one or more portions of a trip, and to allow or require a driver to manually operate the vehicle for one or more portions of the trip.

The sensors 16 are coupled to the electronic controller 12 and determine one or more attributes of the vehicle and communicate information regarding those attributes to the electronic controller 12 using, for example, electrical signals. The vehicle attributes include, for example, the position of the vehicle or portions or components of the vehicle, the movement of the vehicle or portions or components of the vehicle, the forces acting on the vehicle or portions or components of the vehicle, and the proximity of the vehicle to other vehicles or objects (stationary or moving). The sensors 16 may include, for example, vehicle control sensors (e.g., sensors that detect accelerator pedal position, brake pedal position, and steering wheel position [steering angle]), wheel speed sensors, vehicle speed sensors, yaw sensors, force sensors, odometry sensors, and vehicle proximity sensors (e.g., camera, radar, ultrasonic). The electronic controller 12 receives and interprets the signals received from the sensors to determine values for one or more vehicle attributes, including, for example, vehicle speed, steering angle, vehicle position, pitch, yaw, and roll. The electronic controller 12 controls the vehicle control systems 14 to autonomously control the vehicle (for example, by generating braking signals, acceleration signals, steering signals) based at least in part on the information received from the sensors 16. Some of the sensors 16 may be integrated into the vehicle control systems 14, while others may be deployed on the vehicle separately from the vehicle control systems 14.

The GNSS (global navigation satellite system) system 18 receives radiofrequency signals from orbiting satellites using one or more antennas and receivers (not shown). The GNSS system 18 determines geo-spatial positioning (i.e., latitude, longitude, altitude, and speed) for the vehicle based on the received radiofrequency signals. The GNSS system 18 communicates this positioning information to the electronic controller 12. The electronic controller 12 may use this information in conjunction with, or in place of, information received from the sensors 16 when controlling the autonomous vehicle 11. The electronic controller 12 controls the GNSS system 18 to plan routes and navigate the autonomous vehicle 11. GNSS systems are known, and will not be described in greater detail. Alternative embodiments may use a regional satellite navigation system, and/or a land-based navigation system in conjunction with, or in place of, the GNSS system 18. In some embodiments, the GNSS system 18 may operate using the GPS (global positioning system).

The transceiver 20 is a radio transceiver communicating data over one or more wireless communications networks, such as, for example, cellular networks and land mobile radio networks. The transceiver 20 includes other components that enable wireless communication, which for brevity are not described herein and which may be implemented in hardware, software, or a combination of both. In some embodiments, the transceiver 20 communicatively couples the electronic controller 12 with private or public data networks (e.g., the Internet). In some embodiments, the transceiver 20 also operates to provide wireless communications within the vehicle using suitable network modalities (e.g., Bluetooth™, near field communication, Wi-Fi™, and the like). Accordingly, portable electronic devices may communicatively couple to, and communicate with, the electronic controller 12 and other components of the autonomous vehicle control system 10.

The human machine interface (HMI) 22 provides an interface between the autonomous vehicle control system 10 and the driver. The HMI 22 is electrically coupled to the electronic controller 12 and receives input from the driver, receive information from the electronic controller 12, and provides feedback (e.g., audio, visual, haptic, or a combination thereof) to the driver based on the received information. The HMI 22 provides suitable input methods such as a button, a touch-screen display having menu options, voice recognition, etc. for providing inputs from the driver that may be used by the electronic controller 12 as it controls the vehicle.

The HMI 22 is provides visual output such as, for example, graphical indicators (i.e., fixed or animated icons), lights, colors, text, images, combinations of the foregoing, and the like. The HMI 22 includes a suitable display mechanism for displaying the visual output, for example, an instrument cluster, a mirror, a heads-up display, a center console display screen (for example, a liquid crystal display (LCD) touch screen, or an organic light-emitting diode (OLED) touch screen), or through other suitable mechanisms. In alterative embodiments, the display screen may not be a touch screen. In some embodiments, the HMI 22 includes a graphical user interface (GUI) (for example, generated by the electronic processor 24, from instructions and data stored in the memory 26, and presented on the display screen) that enables a user to interact with the autonomous vehicle control system 10. The HMI 22 may also provide audio output to the driver such as a chime, buzzer, voice output, or other suitable sound through a speaker included in the HMI 22 or separate from the HMI 22. In some embodiments, HMI 22 is configured to provide haptic outputs to the driver by vibrating one or more vehicle components (e.g., the vehicle's steering wheel and the driver's seat), such as through the use of a vibration motor. In some embodiments, HMI 22 provides a combination of visual, audio, and haptic outputs. In some embodiments, the HMI 22 causes the visual, audio, and haptic outputs to be produced by a smart phone, smart tablet, smart watch, or any other portable or wearable electronic device communicatively coupled to the vehicle, for example, via the transceiver 20.

Figure 2B:
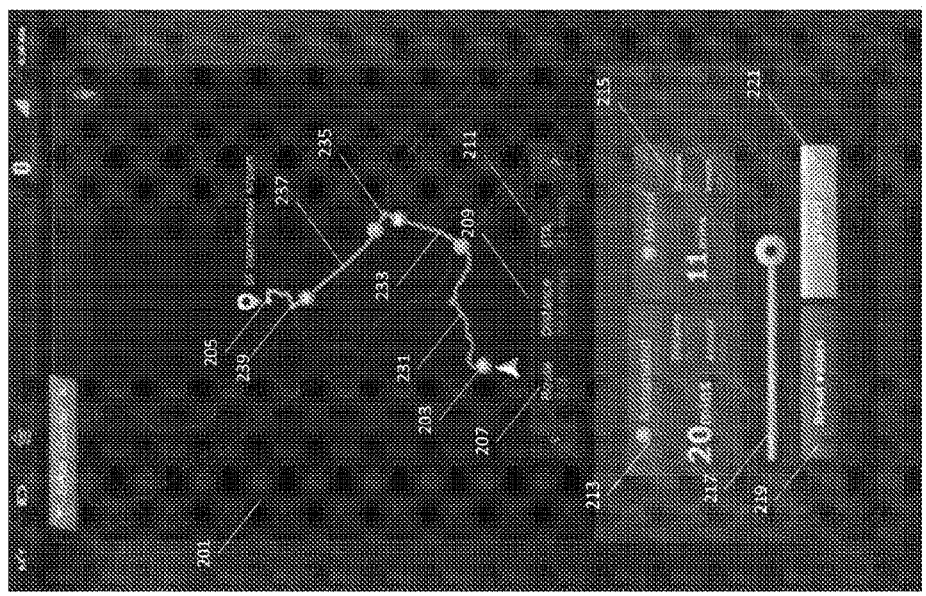
FIG. 2B is the user interface of FIG. 2A displayed according to a second automatic-manual driving preference ratio.
Figure 2A:
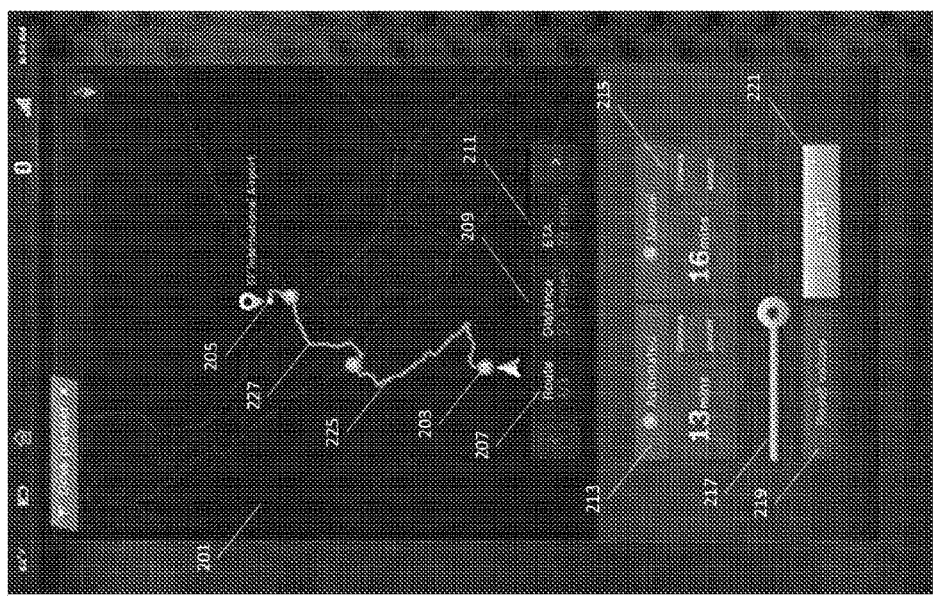
FIG. 2A is a user interface displayed by the autonomous vehicle control system of FIG. 1 according to a first automatic-manual driving preference ratio.

FIGS. 2A and 2B illustrate one example of a graphical user interface that is displayed on a display, for example, of the HMI 22. The user interface includes a map 201 illustrating a starting point 203, a destination point 205, and an illustrated route between the starting point 203 and the destination point 205. As described in further detail below, the system may calculate a plurality of different routes from the starting point 203 to the destination point 205. The user interface identifies each calculated route by a route number 207 (shown on the example of FIG. 2A as "Route 1/3"). The user interface also displays metric information for the route including a distance 209 from the starting point 203 to the destination point 205 and an estimated time until arrival (ETA) 211.

In this example, the system is further configured to determine which portions of a planned travel path can be controlled autonomously by the vehicle system (e.g., simple terrain such as straight and uniform roads) and which portions require user operation (e.g., challenging terrain such as curvy roads). The system calculates an estimated portion of the route that will be controlled autonomously by the vehicle (including time, distance and percentage of total route) and displays this information on the user interface (i.e., automated drive information 213). Similarly, the system also calculates an estimated portion of the route that must be controlled manually (including time, distance, and percentage of total route) and displays this information on the user interface (i.e., manual drive information 215).

Although the automated driving and navigation systems may be configured to determine which travel route has the shortest distance or the shortest travel time, this may not always be the preferred route for the driver of the vehicle. For example, a driver may be willing to accept a longer total drive time if it results in a longer percentage of automated driving and a shorter percentage of manual operation. Conversely, a driver may prefer to enjoy the experience of the vehicle dynamics and, as such, may prefer a route with curvy roads that will require manual operation. Similarly, a driver may prefer to control the vehicle manually when operating in urban environments with a higher likelihood of accidents.

To this end, the user interface further includes a slider control 217 through which a user can define a proportional amount of automated driving relative to manual driving. As the slider control 217 is moved to the left, the percentage of manual driving is increased and, as the slider control 217 is moved to the right, the percentage of automated driving is increased. As the slider is moved, the system identifies a travel route that most closely fits the defined automated-manual driving preference ratio defined by the slider control 217 and updates the map accordingly. To recalculate or reset the values, a "reset values" button 219 is provided on the user interface. Once a user selects a route that matches their preference, they select the "start" button 221 on the user interface and manual/automated navigation commences.

The manner in which the driver of the vehicle is able to define a manual-automated driving preference ratio by using the slider control 217 is further illustrated by comparing FIG. 2A to the example of FIG. 2B. In FIG. 2A, the user interface is displaying the calculated route with the shortest total travel time and distance. The entire trip using route of FIG. 2A will take 29 minutes—13 minutes of automated operation and 16 minutes of manual operation. The selected route in FIG. 2A is divided into three different driving sections—a first manual driving section 225, a first automatic driving section 227, and a short final manual driving section prior to reaching the destination.

To reduce the amount of manual operation required, the user moves the slider control 217 to the right as shown in the example of FIG. 2B. Moving the slider control 217 in this way adjusts the automatic-manual driving preference ratio and the user interface changes to display another route that more closely matches the selected driving preference ratio. In FIG. 2B, the total distance and drive time required is higher than in the example of FIG. 2A—this time requiring an estimated total travel time of 31 minutes. However, the amount of manual drive time is reduced from 16 minutes in FIG. 2A to 11 minutes in FIG. 2B. The selected route in FIG. 2B is divided into five different driving sections—a first manual driving section 231, a first automatic driving section 233, a second manual driving section 235, a second automatic driving section 237, and a third/final manual driving section 239 just prior to arriving at the destination. As such, by adjusting the driving preference ratio, the driver has selected a route that, although longer in total distance, includes a smaller amount of manual driving.

Figure 3:
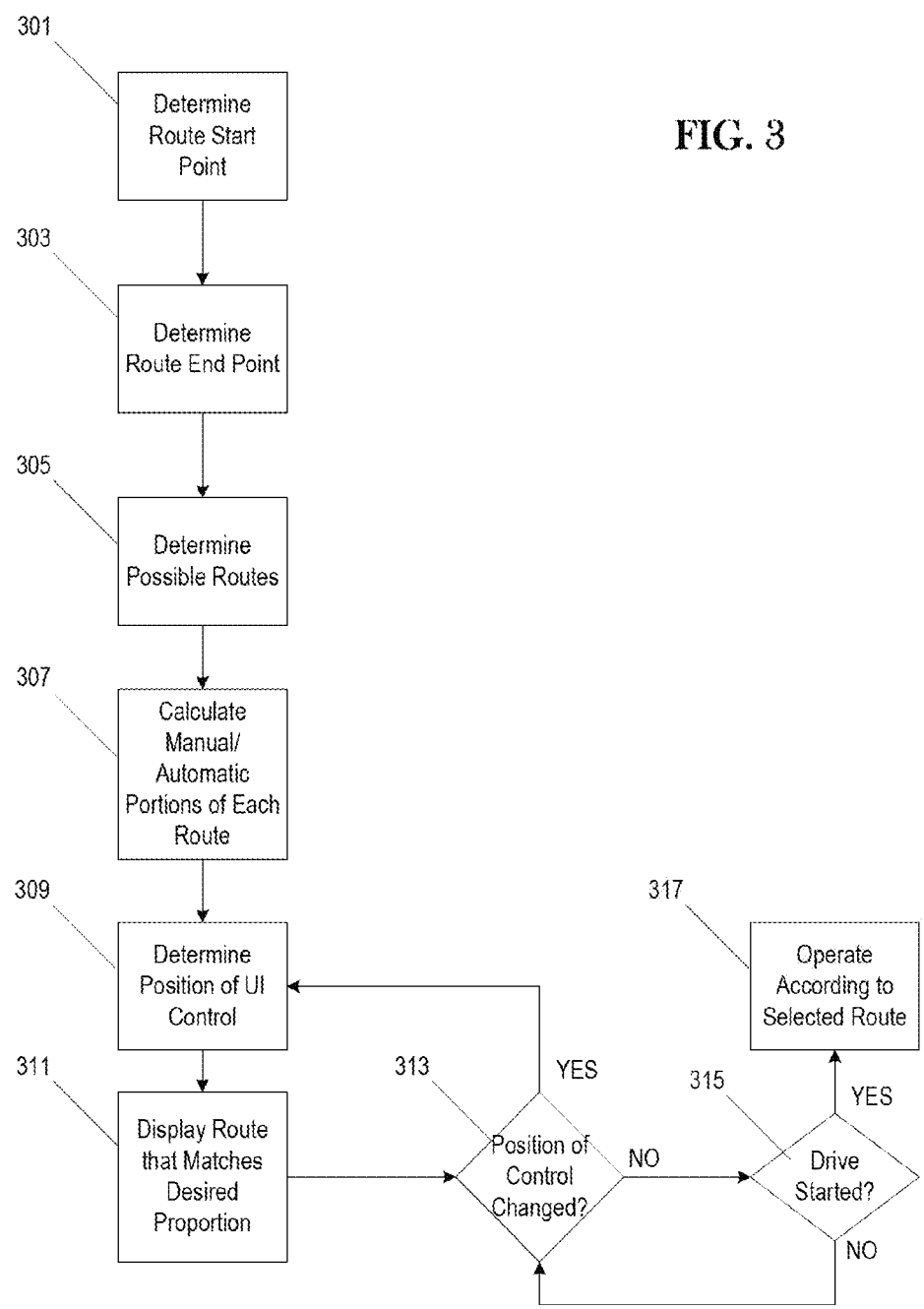
FIG. 3 is a flowchart of a method of operating an automatic vehicle system based on a selected automatic-manual driving preference ratio.

FIG. 3 illustrates a method of operating the user interface, such as those illustrated in FIGS. 2A and 2B, in selecting a route that matches the driver preference criteria. The system determines a start point for the route (step 301) and an destination/end point for the route (step 303). This can be done by using the GNSS system to determine the current location of the vehicle (e.g., the start point) and receiving from the user through the user interface a name or address of the destination. The system then calculates a plurality of possible routes from the start point to the destination (step 305) and calculates manual & automatic driving portions for each of the possible routes (step 307). The system then determines the position of the user interface control (e.g., the slider control illustrated in FIGS. 2A & 2B) (step 309) and determines a automatic-manual driving preference ratio based on the position of the user interface control. The system identifies a route from the plurality of calculated routes that most closely matches the defined automatic-manual driving preference ratio and displays that route and the associated metrics on the user interface screen (step 311).

The system then continues to monitor the user interface to detect when the position of the user interface control is changed (step 313). If the position of the control is changed, then the system again determines the position of the control (step 309) and displays the route that most closely matches the defined driving preference ratio (step 311). However, when the driver selects the "start" button on the user interface or begins driving the vehicle (step 315), the route that is selected/displayed at that time is locked and the vehicle begins to operate according to the selected route (step 317).

In some embodiments, the system is further configured to detect when the driver has deviated from the defined route during manual operation and when driving conditions have changed such that the selected route no longer matches the defined driving preference ratio. In such cases, the system may be configured to automatically recalculate and display a new route that most closely matches the automatic-manual driving preference ratio that was defined by the user at the beginning of travel.

Thus, the invention provides, among other things, a navigation and planning system for a vehicle equipped with an autonomous driving system that allows the driver to select a route based on an automatic-manual driving preference ratio. Various features and advantages of the invention are set forth in the following claims.

What is claimed is:

1. A navigation system for a vehicle equipped with an autonomous driving system, the navigation system comprising:
    a human-machine interface including a display and a user control; and
    an electronic controller communicative coupled to the human-machine interface and configured to
        calculate a plurality of travel routes from a determined starting point to a defined destination point;
        determine which portions of each travel route will utilize automated driving operation and which portions will utilize manual driving operation;
        define, based on an input from the user control, an automatic-manual driving preference ratio indicating a driver preference for an amount of manual driving operation relative to an amount of automatic driving operation;
        automatically select a route from the plurality of travel routes that most closely matches the defined automatic-manual driving preference ratio; and
        output the selected route on the display.

2. The navigation system of claim 1, wherein the human-machine interface includes a touch-screen display and wherein the electronic controller is further configured to display an adjustable user control on the touch-screen display and to define the automatic-manual driving preference ratio based on a positioning of the adjustable user control on the touch-screen display.

3. The navigation system of claim 2, wherein the electronic controller is further configured to
    detect a change in the positioning of the adjustable user control,
    define an updated automatic-manual driving preference ratio based on the change in the positioning of the adjustable user control,
    select an updated route from the plurality of routes that most closely matches the updated automatic-manual driving ratio, and
    output the updated route on the display.

4. The navigation system of claim 3, wherein the electronic controller is configured to output the selected route on the display by displaying an indication of a time and a distance of automatic driving operation in the selected route and a time and a distance of manual driving operation in the selected route, and wherein the electronic controller is configured to output the updated route on the display by displaying an indication of a time and a distance of automatic driving operation in the updated route and a time and distance of manual driving operation in the updated route.

5. The navigation system of claim 2, wherein the adjustable user control includes a slider bar control and wherein the automatic-manual driving preference ratio is defined based on a relative positioning of the slider bar control.

6. The navigation system of claim 1, wherein the electronic controller is configured to output the selected route on the display by displaying a map of the selected route on the display, the displayed map including a visual indication of the portions of the route that will utilized automated driving operation and a visual indication of the portions of the route that will utilize manual driving operation.

7. A method for defining a travel route for a vehicle including an autonomous driving system, the travel route including at least a portion of the travel route for automatic driving operation, the method comprising:
calculating a plurality of travel routes from a determined starting point to a defined destination point;
determining which portions of each travel route will utilize automated driving operation and which portions will utilize manual driving operation;
defining, based on an input from the user control, an automatic-manual driving preference ratio indicating a driver preference for an amount of manual driving operation relative to an amount of automatic driving operation;
automatically selecting a route from the plurality of travel routes that most closely matches the defined automatic-manual driving preference ratio; and
outputting the selected route on the display.

8. The method of claim 7, further comprising displaying an adjustable user control on a touch-screen display and defining the automatic-manual driving preference ratio based on a positioning of the adjustable user control on the touch-screen display.

9. The method of claim 8, further comprising:
detecting a change in the positioning of the adjustable user control,
defining an updated automatic-manual driving preference ratio based on the change in the positioning of the adjustable user control,
selecting an updated route from the plurality of routes that most closely matches the updated automatic-manual driving ratio, and
outputting the updated route on the display.

10. The method of claim 9, wherein outputting the selected route on the display includes displaying an indication of a time and a distance of automatic driving operation in the selected route and a time and a distance of manual driving operation in the selected route, and wherein outputting the updated route on the display includes displaying an indication of a time and a distance of automatic driving operation in the updated route and a time and distance of manual driving operation in the updated route.

11. The method of claim 8, wherein the adjustable user control includes a slider bar control and wherein the automatic-manual driving preference ratio is defined based on a relative positioning of the slider bar control.

12. The method of claim 7, wherein outputting the selected route on the display includes displaying a map of the selected route on the display, the displayed map including a visual indication of the portions of the route that will utilized automated driving operation and a visual indication of the portions of the route that will utilize manual driving operation.

* * * * *